United States Patent [19]

Sharp

[11] 4,300,337
[45] Nov. 17, 1981

[54] POWER OPERATED BRUSH RAKE

[76] Inventor: David E. Sharp, Rte. 104, North Rose, N.Y. 14516

[21] Appl. No.: 128,794

[22] Filed: Mar. 10, 1980

[51] Int. Cl.³ .............................................. A01D 78/06
[52] U.S. Cl. ........................................ 56/376; 56/364
[58] Field of Search ................. 56/376, 377, 364, 14.9, 56/15.9, 15.5, 16.2; 171/15, 126

[56] References Cited

U.S. PATENT DOCUMENTS

| | | | |
|---|---|---|---|
| 1,406,506 | 2/1922 | Stansberry | 56/376 |
| 1,946,692 | 2/1934 | Hartley | 56/364 |
| 2,385,829 | 10/1945 | Melroe | 56/364 |
| 2,699,639 | 1/1956 | Lambert et al. | 56/376 |
| 3,237,390 | 3/1966 | Murphy | 56/376 |
| 4,048,789 | 9/1977 | Cartner | 56/16.2 |
| 4,202,159 | 5/1980 | Young | 56/364 |

FOREIGN PATENT DOCUMENTS 2381462 10/1978 France .................................. 56/376

*Primary Examiner*—Paul J. Hirsch
*Attorney, Agent, or Firm*—Charles S. McGuire

[57] ABSTRACT

A rake for attachment to a tractor and operation by the tractor hydraulic system. Rake tines are carried on an endless chain by pivotally mounted brackets along upper and lower runs with counterbalance means providing pivotal movement of the tines between folded and extended positions while traveling along the upper and lower runs, respectively. The rake may be moved to extend laterally outward from the tractor for raking between trees, and the like. The mounting and guide means for the chain and teeth-carrying brackets provide a sturdy and efficient raking action while avoiding clogging as brush is removed.

6 Claims, 8 Drawing Figures

POWER OPERATED BRUSH RAKE

BACKGROUND OF THE INVENTION

The present invention relates to power-operated rakes and similar implements, and more specifically of rakes of the type adapted to extend laterally from and rake in a direction laterally of a tractor to which the rake is attached.

In many agricultural applications, notably the keeping of orchards, it is desirable to remove prunings, dead brush and weeds, fallen limbs, etc., from locations which are inaccessible to tractors or other conventional powered equipment. A great deal of labor is required for the manual removal of such materials in large orchards. In most commercial scale fruit orchards the trees are planted in hedgerows which are spaced widely enough to allow a tractor to travel between rows, but not between the trees in a given row.

It is a principal object of the present invention to provide novel and improved powered rake apparatus for removing brush and the like from areas in which access by conventional powered equipment is difficult.

Another object is to provide raking apparatus wherein elongated tines travel in an endless path along upper and lower runs and are moved by gravity between folded and extended positions when traveling along the upper and lower runs, respectively.

A further object is to provide raking apparatus for attachment to a tractor which supplies power for moving rake tines along an endless path and also for moving the apparatus to various positions relative to the tractor.

Other objects will in part be obvious and will in part appear hereinafter.

SUMMARY OF THE INVENTION

In accordance with the foregoing objects, the invention contemplates a piece of equipment wherein an endless chain is operatively connected about a pair of sprockets one of which is powered by the hydraulic system of a tractor to which the equipment is attached. Mounting brackets are affixed to the chain at spaced intervals, and one or more elongated rake tines are pivotally mounted upon each bracket. Counterbalance means in the form of a pair of rigid arms are affixed to the tines for pivotal movement therewith.

The path of movement of the chain is generally divided into the upper and lower runs. The arrangement and weight of the tines and counterbalance relative to the pivot point are such that, as the tines move between the upper and lower runs, they are rotated by gravity from a retracted or folded position when traveling along the upper run to an operative, outwardly extending position when traveling along the lower run. A pair of rigid bars or elongated plates are positioned on opposite sides of the chain path along the lower run. These bars are contacted by the counterbalance arms to prevent rotation of the tines away from the operative position while traveling along the lower run and pulling brush, etc.

The rake is attached to the tractor by hitch means which allow movement of the rake about a plurality of pivot points. For example, the rake may be extended and retracted laterally of the tractor in a direction generally parallel to the plane of chain travel. Also, the rake may be elevated and lowered about a horizontal axis parallel to direction of chain travel, and pivoted about a second horizontal axis perpendicular to the first within a limited arc to position the chain runs generally parallel to the surface being raked when working on sloped ground. Extensible and retractable cylinders for effecting the various rake movements are also powered by the tractor hydraulic system.

DETAILED DESCRIPTION

Figure 1:
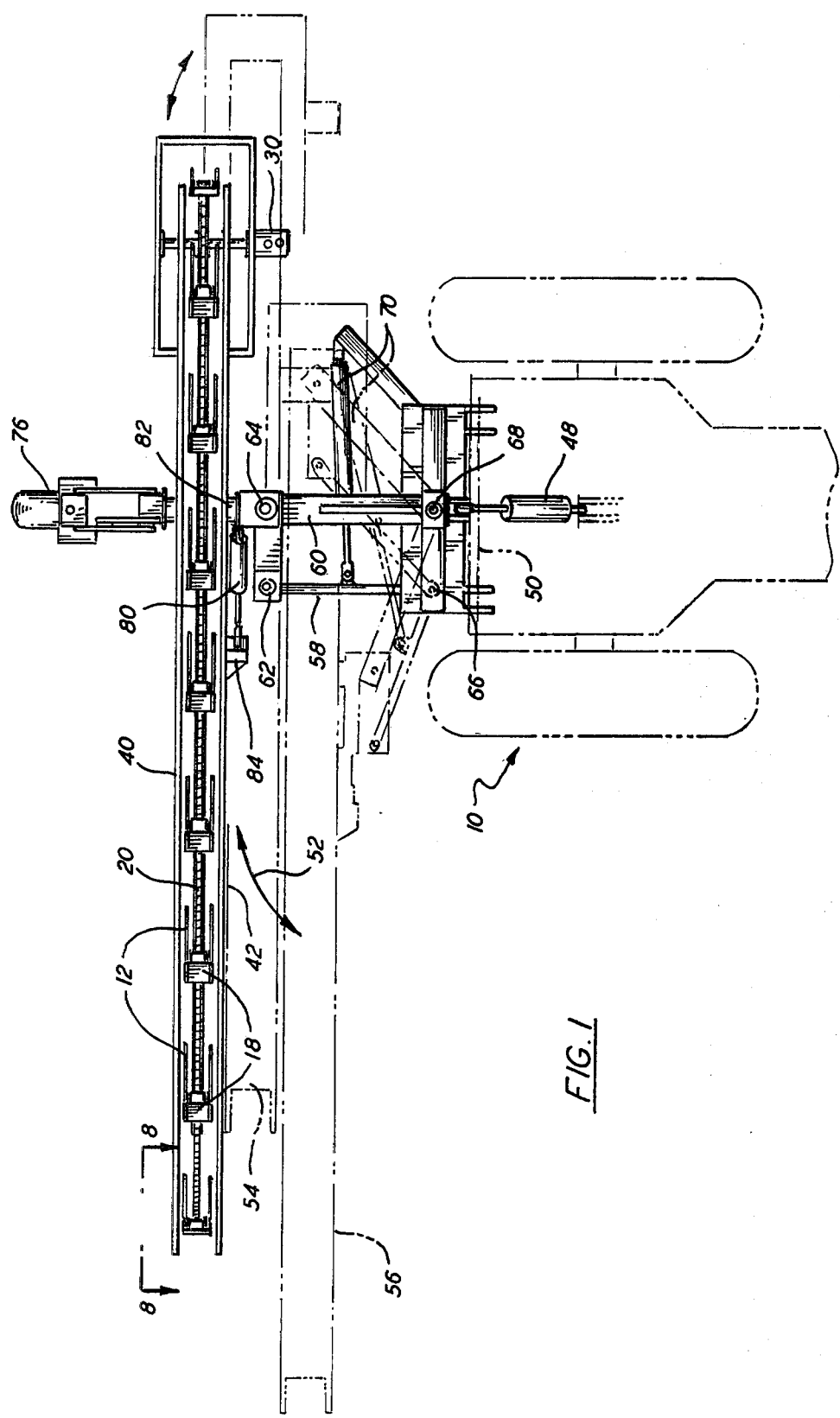
FIG. 1 is a plan view of the preferred embodiment of the rake apparatus, attached to a tractor, a fragment of which is shown in phantom lines.
Figure 6:
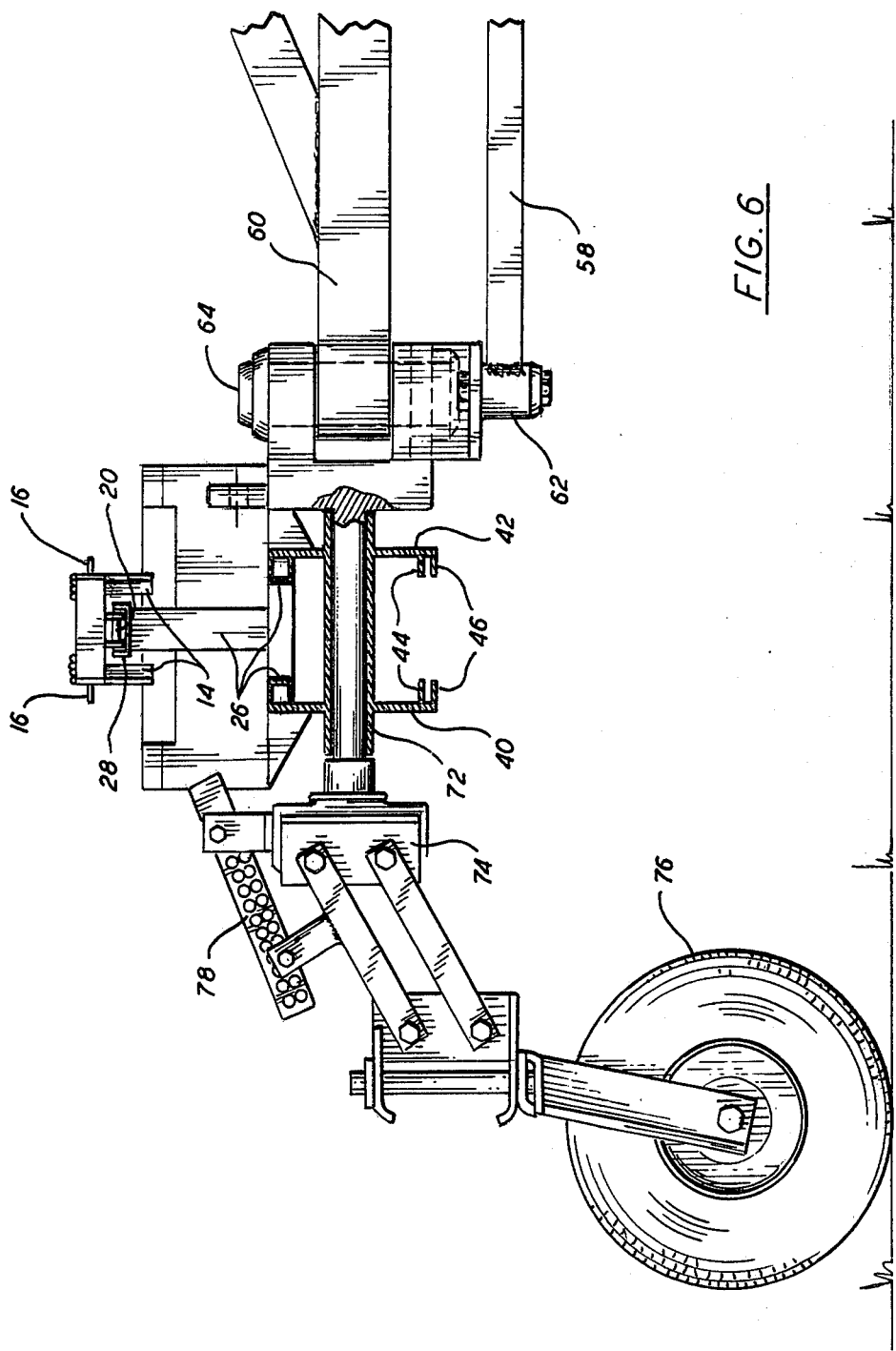
FIG. 6 is an end elevational view in section on the line 4—4 of FIG. 1.

Referring now to the drawings, the rake apparatus of the invention is intended to be towed and selectively positioned by a suitable vehicle such as a farm tractor, an example of which is shown in phantom lines in FIGS. 1 & 6, denoted generally by reference numeral 10. Tractor 10 includes a conventional hydraulic system providing pressurized fluid for transmitting power to various elements to which the hydraulic lines are connected. The rake apparatus includes elements by which it is attached to tractor 10 and moved about various axes relative thereto, such elements being described later in more detail.

The raking operation is performed by a plurality of elongated teeth or tines 12 which, in the illustrated embodiment are provided in pairs formed from a continuous length of spring steel. The tine pairs are joined by a central coiled and laterally extending portion, seen most clearly in their entirety in FIG. 7 and commercially available in such form. Each pair of tines 12 is rigidly affixed to counterbalance means, the purpose and operation of which is explained later, which includes a pair of arms 14 arranged at an obtuse angle to the general axis of tines 12. Pins 16 provide a pivotal mounting for arms 14, and thereby tines 12, upon mounting brackets 18. Each of brackets 18 is fixedly attached to endless, flexible chain 20, in spaced relation along the length thereof.

Chain 20 is trained about toothed sprockets 22 and 24 which are mounted for rotation about horizontal axes upon a support frame, comprised of various structural elements rigidly interconnected and each denoted by reference numeral 26. The path of chain 20, as established by sprockets 22 and 24, is divided into upper and lower, generally horizontal, runs. Channel member 28, supported by elements of frame 26, extends along the upper run for substantially the entire distance between the sprockets, providing a guide for this portion of the chain travel. Hydraulic motor 30 receives power from a pump (not shown) connected to the rear power take-off shaft of tractor 10 under the control of a suitable valve (not shown) and is operatively connected to sprocket 24 to effect rotation thereof, thus moving chain 20 in its endless path.

Figure 2:
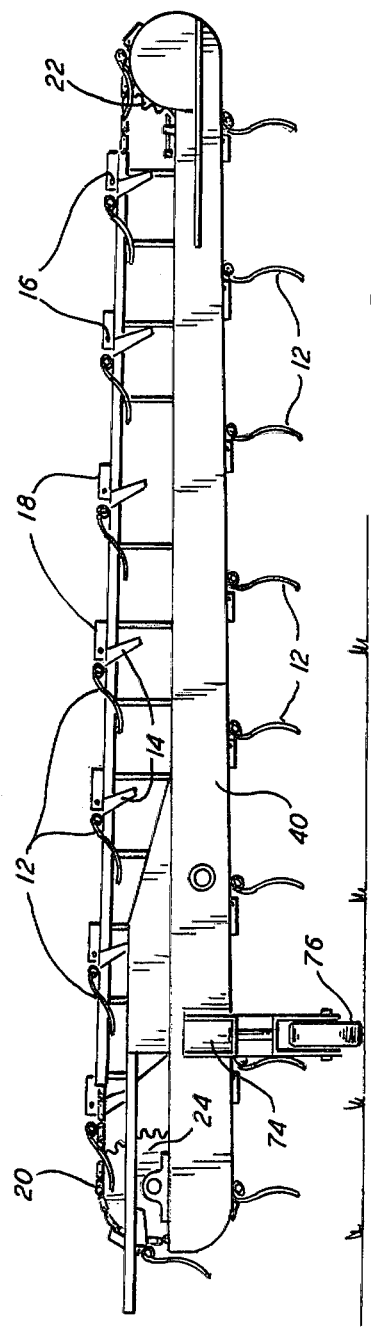
FIG. 2 is an elevational view of one side of the rake apparatus.
Figure 3:
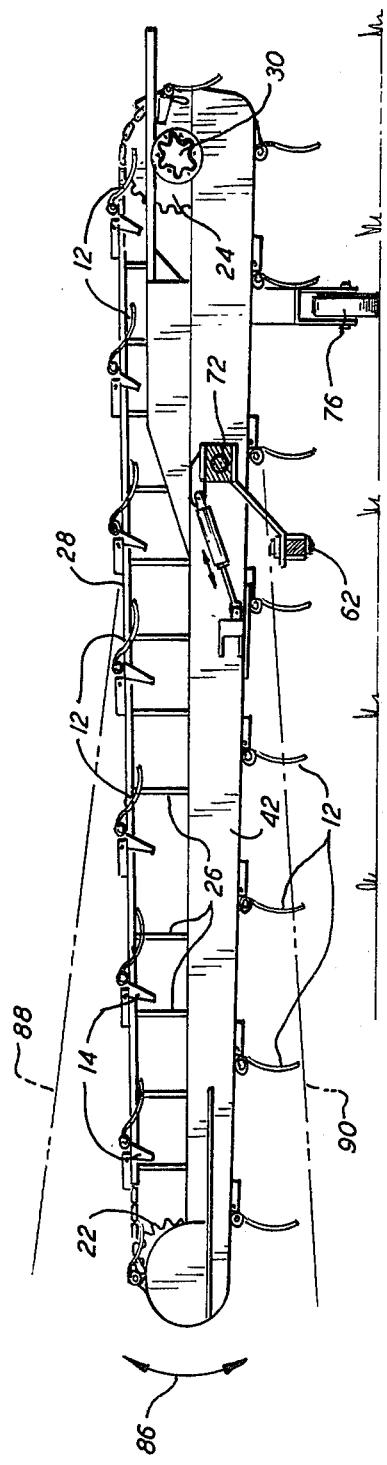
FIG. 3 is an elevational view of the side of the apparatus opposite that of FIG. 2.
Figure 7:
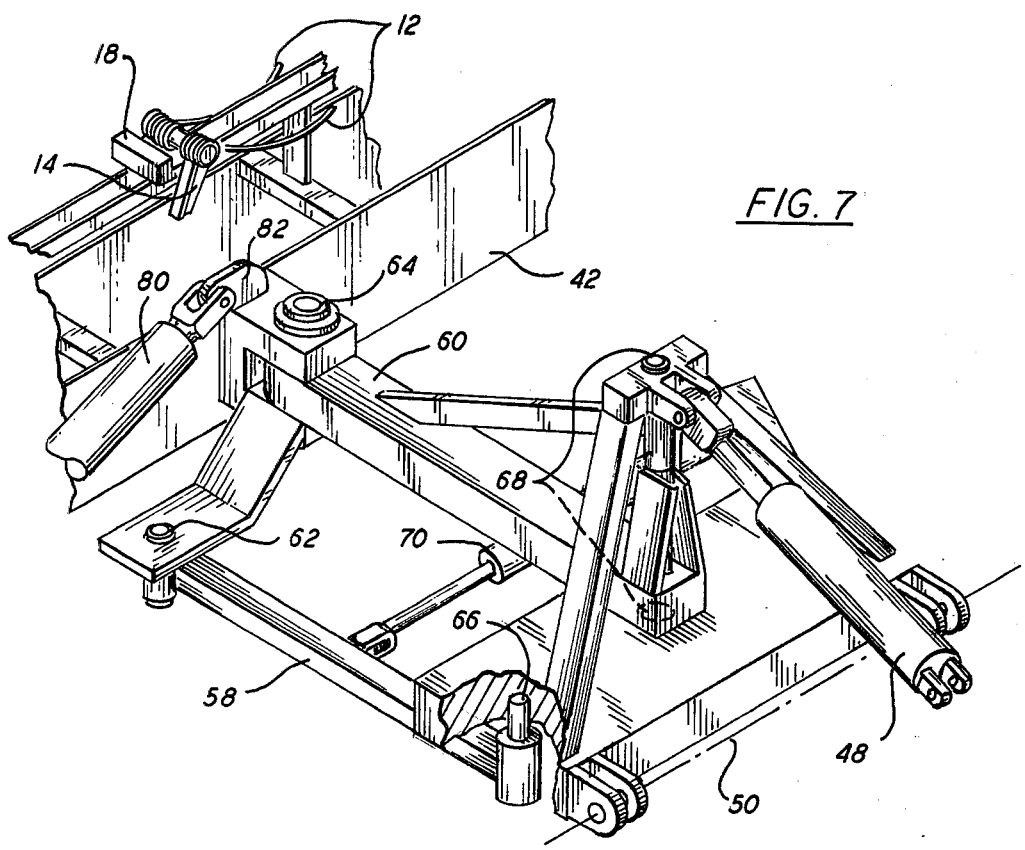
FIG. 7 is a fragmentary, perspective view of portions of the apparatus, including those by which the rake is attached to the tractor.
Figure 8:
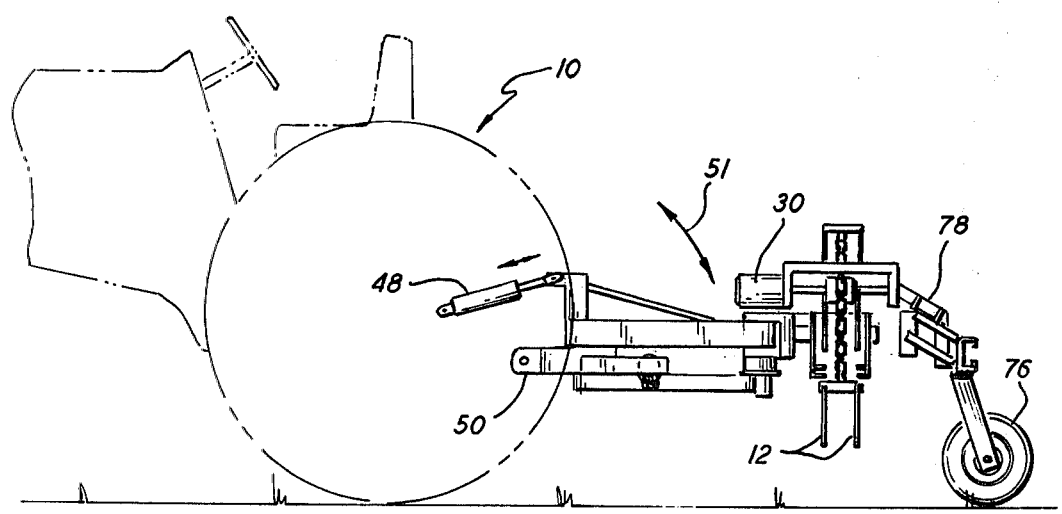
FIG. 8 is an end elevation of the apparatus, with a fragment of the tractor shown in phantom lines.

As best seen in FIGS. 7 and 8, as well as FIGS. 2 and 3, tines 12 and arms 14 rotate about pin 16 between a retracted or folded position wherein substantially no portion thereof extends outwardly from chain 20 when traveling along the upper run, and a position wherein tines 12 extend outwardly from the chain when traveling on the lower run. Movement between the two positions is effected by gravity as chain 20 travels about its endless path due to the relative arrangement of the tines, arms and pivot axis. Arms 14 and tines 12 are supported on the same side of the axis of pin 16, whereby their weight tends to rotate the unit in a counterclockwise direction while traveling along the upper run, when viewed from the side shown in FIGS. 2, 7 and 8. The extent of such rotation is limited by contact of portions of arms 14 with mounting bracket 18 at the points indicated in FIGS. 7 and 8 by reference numeral 32.

Figure 4:
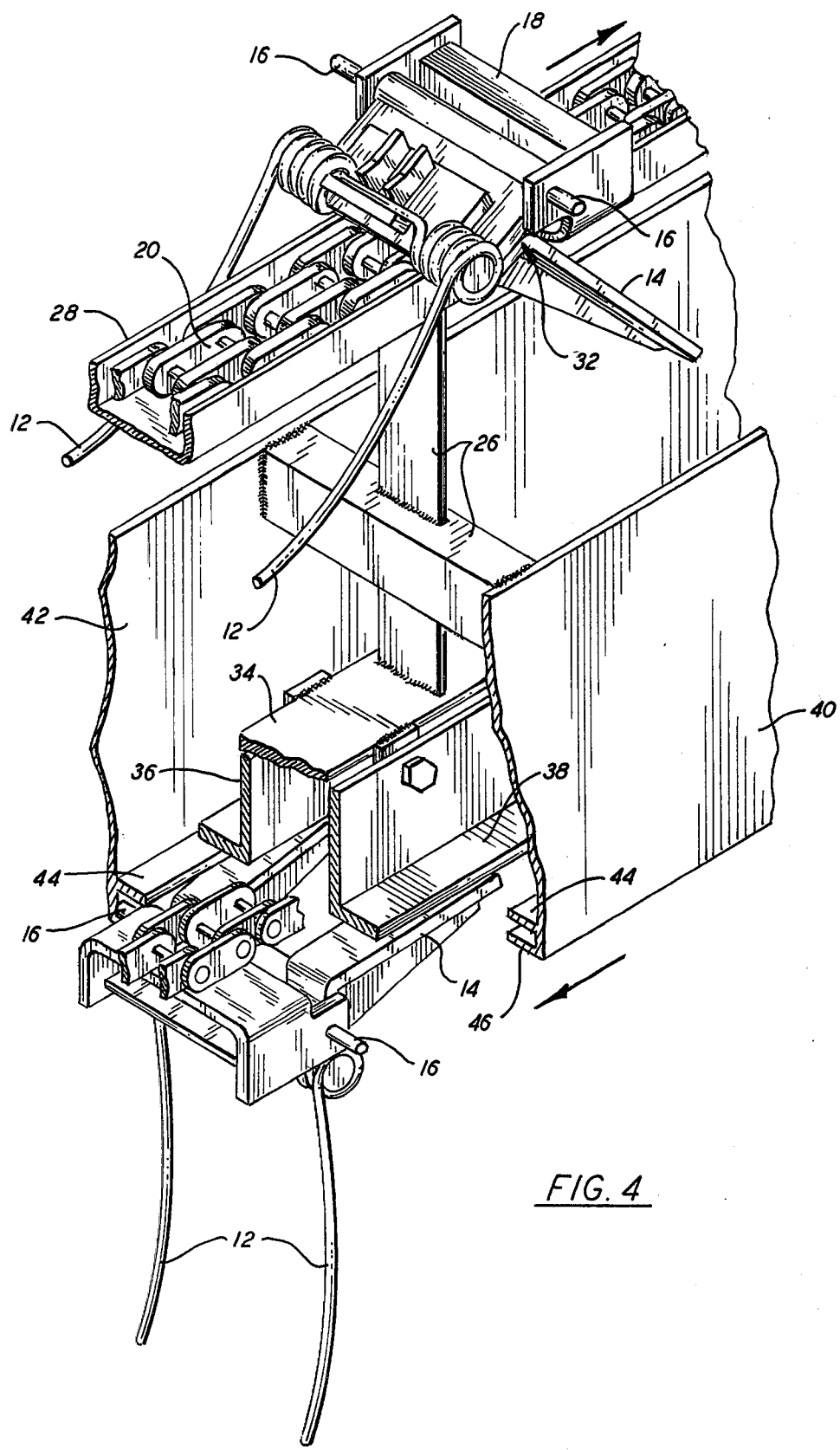
FIG. 4 is an enlarged, fragmentary, perspective view of portions of the rake apparatus.
Figure 5:
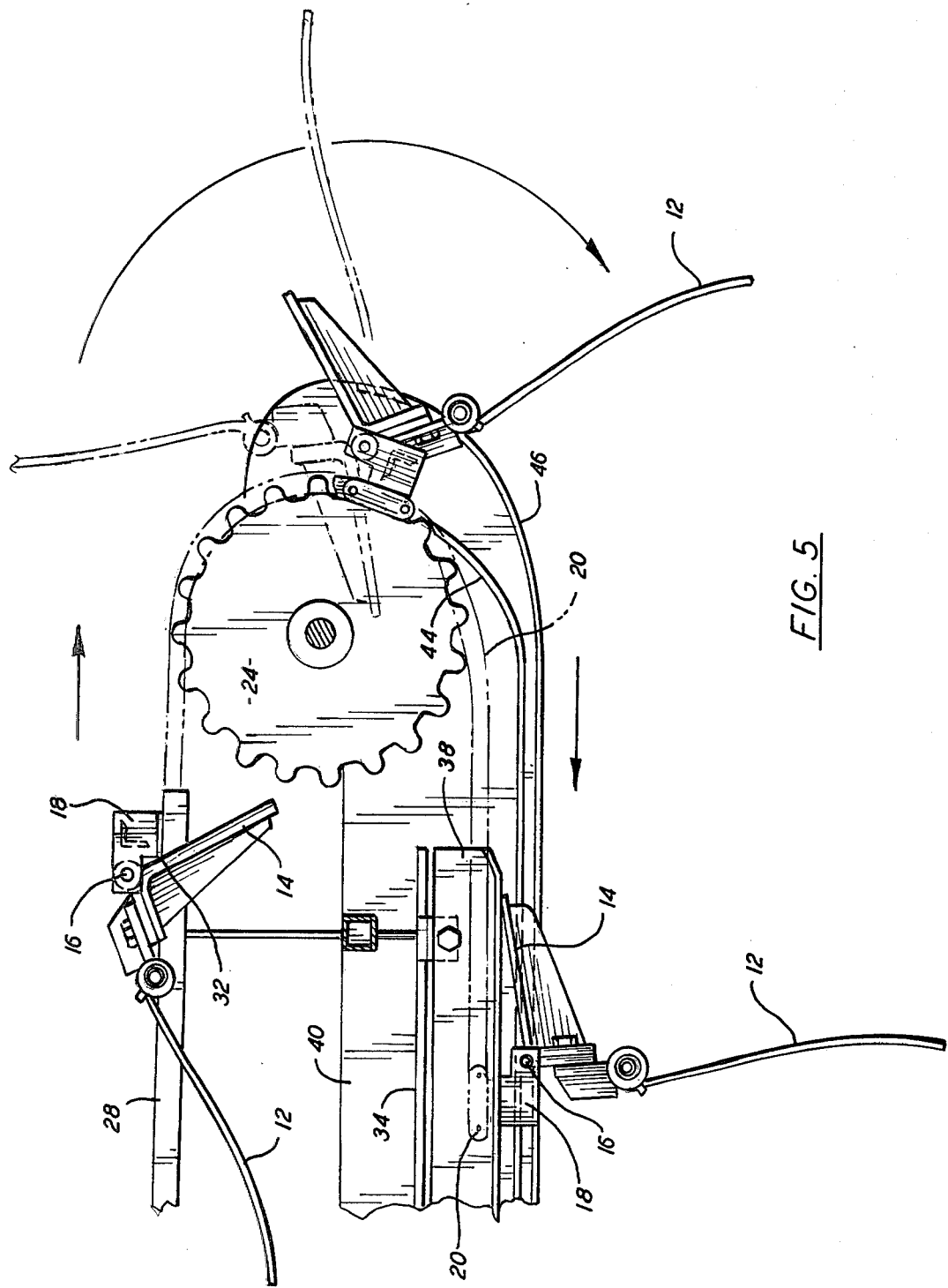
FIG. 5 is a fragmentary, elevational view of one end of the apparatus, as seen from the position indicated by line 8—8 of FIG. 1.

As each pair of tines and arms travels around sprocket 24 in passing from the upper to the lower run, the position of the elements shifts with respect to the gravitational component through the pivot axis of pin 16. Approximately as each mounting bracket 18 passes a horizontal line through the axis of rotation of sprocket 24 tines 12 and arms 14 are rotated by gravity in a clockwise direction as seen in FIG. 8 and assume an equilibrium position with tines 12 extending outwardly from chain 20. Thus, while traveling along the lower run, splines 12 extend toward the ground to engage and move brush and other loose material toward the end of the rake apparatus to the rear of tractor 10. Plate 34 forms a part of support frame and is rigidly attached to other components thereof. A pair of elongated angle bars 36 and 38 are bolted to plate 34 to define a pair of downwardly facing surfaces for contact by arms 14 while traveling along at least a portion of the lower run. That is, tines 12 are maintained in the outwardly extending position in spite of the tendency of brush and other materials engaged by the tines tending to cause rotation about the freely pivotal mounting in a counterclockwise direction as seen in FIGS. 4 and 5. Rotation in this direction is thus limited by contact of arms 14 with the lower surfaces of angle bars 36 and 38.

Preferably, angle bars 36 and 38 are easily removable to allow replacement with bars of different lengths, or the bars are telescoping or otherwise adjustable in length. In any case, one end of each of the bars is positioned closely adjacent sprocket 24 and the bars extend to whatever point along the lower run that it is desired to release the brush, etc. That is, once there is no longer a rigid member to limit rotation of the arms and tines, the resistance to movement of the brush will normally cause rotation of the tines and arms, allowing the brush to remain stationary and be released at a position where it is easily accessible for pick-up and disposal.

Another important feature of the construction is the provision of inwardly facing channels on each side of the lower run, defined by members which confine the ends of pins 16 on three sides. Side plates or covers 40 and 42 are attached to support frame 26 on both sides of the apparatus, providing protection against brush or other materials being caught in the chain or sprockets. A pair of plates or flat bars are attached to the inside surface of both side plates 40 and 42. As seen in FIG. 5, upper and lower bars 44 and 46, respectively, converge gradually from one end adjacent sprocket 24 to a parallel position defining inwardly facing channels extending along both sides of the lower run of chain travel. These channels are dimensioned and arranged to receive both ends of pins 16, as best shown in FIG. 4, along substantially the entire lower run. By thus confining the pins, any significant amount of twisting motion of the chain and elements mounted thereon, which might be produced as brush or other materials are dragged along by tines 12 is prevented.

The rake apparatus thus far described is attached to tractor 10 for movement relative thereto about a plurality of axes. Such motion is produced by extensible and retractable cylinders powered by the tractor hydraulic system. The rake is attached to the usual 3-point hitch, cylinder 48 being attached to the upper point for raising and lowering the entire apparatus about axis 50 through the two lower pivot points, as indicated in FIG. 8 by arrow 51.

The rake apparatus may be swung about a double pair of pivots for lateral movement with respect to tractor 10, as indicated in FIG. 1 by arrow 52, between inner and outer limits shown in dot-dash lines and respectively denoted by reference numerals 54 and 56. The apparatus is shown in solid lines in an intermediate position of lateral movement. Rigid bars 58 and 60 are pivotally connected at 62 and 64, respectively, at one end of each and at 66 and 68 at the other ends, to the mounting frame structure. Extension and retraction of cylinder 70 produces the lateral, swinging movements about the two pairs of vertical axis pivots.

The rake apparatus may also be moved about a second horizontal axis, perpendicular to axis 50 through the lower pivots of the three point hitch. Hollow rod 72 extends through side plates 40 and 42 (FIG. 6) and is rotatably attached at one end to a portion of the mounting frame structure and at the other end to mounting unit 74 for wheel 76. As is apparent from FIG. 6, the vertical position of wheel 76 with respect to the rake apparatus per se is selectively adjustable by means of a linkage wherein one of the links 78 is provided with a plurality of holes for insertion of the bolt which rigidizes the linkage position. Cylinder 80 is connected at one end to rigid member 82 on the mounting frame structure and at the other end to member 84 on side plate 42 of the rake frame. Thus, by extension and retraction of cylinder 80 the rake apparatus may be pivoted about rod 72 in the directions indicated in FIG. 3 by arrows 86 to position the upper run of chain 20 generally along axis 88 or the lower run along axis 90. This permits the rake to be operated on ground which slopes either up or down laterally of the position of tractor 10.

From the foregoing it is apparent that the rake apparatus of the invention allows efficient raking in areas difficult to access by powered equipment through the employment of a cooperative action of novel and improved elements. Other types of raking and windrowing applications for the apparatus are also contemplated.

What is claimed is:

1. Powered rake apparatus for attachment to a tractor, or the like, for operation by power supplied from the tractor while in a stationary position, said apparatus comprising:

(a) a support frame extending substantially horizontally between first and second ends;

(b) a pair of side plates supported in spaced, substantially vertical planes on each side of said frame and extending between said first and second ends thereof;

(c) an endless, flexible chain having a plurality of mounting brackets fixedly connected to said chain;

(d) a pair of rotatable sprockets respectively supported at said first and second frame ends to define a horizontally elongated path of movement for said chain divided into upper and lower runs between said side plates, one of said sprockets being powered to move said chain along said path;

(f) a pair of elongated, unitary rake tines pivotally mounted upon each of said mounting brackets by a pin having end portions extending laterally outward from each side of said brackets;

(g) a pair of counterbalance arms fixedly connected to each of said pair of tines for rotation therewith about said pin, the arrangement of said tines, arms and pin being such that while traveling along said upper run said tines are maintained by gravity in a folded position substantially entirely below said chain, and when passing from said upper to said lower run said tines and arms rotate by gravity to a position wherein said tines extend downwardly from said chains;

(h) a pair of elongated members removably mounted in a fixed position upon said support frame to extend from a position adjacent the end at which travel along said lower run begins for a predetermined portion of said lower run, said elongated members presenting downwardly facing surfaces for contact by said pair of arms to prevent rotation of said arms and tines away from said downwardly extending position of said tines during travel in said portion of said lower run; and (i) a pair of flange members extending inwardly from each of said side plates, each pair of flange members beginning at spaced positions adjacent the end at which travel along said lower run begins and gradually converging to parallel positions spaced by a distance slightly greater than the diameter of said pins, said side plates being spaced from one another by a distance slightly greater than the distance between the ends of said pins, whereby said pins are guided into the parallel portions of said flange members and constrained on three sides by said flange members and said side plates.

2. The invention according to claim 1 (1 wherein said rotary members are mounted on a support frame) and further including means for attaching said support frame to a towing vehicle and means for moving said support frame relative to said vehicle.

3. The invention according to claim 2 wherein said moving means includes powered members for moving said support frame about at least two axes.

4. The invention according to claim 3 wherein both of said axes are horizontal, a first being parallel to the longitudinal axis of said support frame and about which the entire rake may be raised and lowered, and a second being perpendicular to the first axis and about which the longitudinal axis of said support frame may be tilted upwardly or downwardly from the horizontal.

5. The invention according to claim 4 and further including means for effecting lateral movement of the rake with respect to said vehicle.

6. The invention according to claim 5 wherein said means for effecting lateral movement comprises a pair of parallel, rigid bars each pivotally connected at one end to movable pivot points attached directly to the rake and at the other ends to stationary pivot points attacked directly to said vehicle.

* * * * *